United States Patent Office 2,877,226
Patented Mar. 10, 1959

2,877,226

NOVEL QUINOLIZINE COMPOUNDS AND PROCESS FOR THE MANUFACTURE THEREOF

Arnold Brossi and Otto Schnider, Basel, Switzerland, assignors to Hoffmann-La Roche Inc., Nutley, N. J., a corporation of New Jersey No Drawing. Application October 24, 1956
Serial No. 617,938

Claims priority, application Switzerland October 28, 1955

7 Claims. (Cl. 260—287)

The present invention relates to novel quinolizine compounds which are useful as therapeutic agents.

An object of the present invention is to provide quinolizine compounds having the general formula

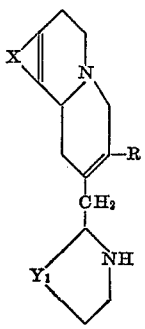

I wherein X represents a member selected from the group consisting of mono-, di-, tri- and tetra-(lower alkoxy)-substituted, and mono- and di-(lower alkylenedioxy)-substituted divalent butadien-1,4-ylene radicals, $Y_1$ represents a member selected from the group consisting of unsubstituted, mono-, di-, tri- and tetra-(lower alkoxy)-substituted, and mono- and di-(lower alkylenedioxy)-substituted o-phenylene radicals, and R represents a lower alkyl radical.

Another object of the present invention is to provide quinolizine compounds having the general formula

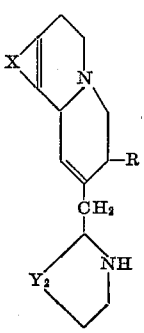

II wherein X represents a member selected from the group consisting of mono-, di-, tri- and tetra-(lower alkoxy)-substituted, and mono- and di-(lower alkylenedioxy)-substituted divalent butadien-1,4-ylene radicals, $Y_2$ represents a member selected from unsubstituted, mono-, di-, tri- and tetra-(lower alkoxy)-substituted, and mono- and di-(lower alkylenedioxy)-substituted divalent cyclic radicals of the group consisting of partially hydrogenated and completely hydrogenated o-phenylene radicals, and R represents a lower alkyl radical.

A further object of the present invention is to provide quinolizine compounds having the general formula

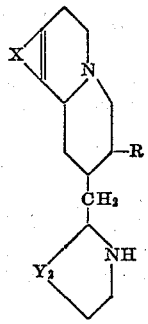

III wherein X represents a member selected from the group consisting of mono-, di-, tri- and tetra-(lower alkoxy)-substituted, and mono- and di-(lower alkylenedioxy)-substituted divalent butadien-1,4-ylene radicals, $Y_2$ represents a member selected from the group consisting of unsubstituted, mono-, di-, tri- and tetra-(lower alkoxy)-substituted, and mono- and di-(lower alkylenedioxy)-substituted divalent cyclic radicals of the group consisting of partially hydrogenated o-phenylene and completely hydrogenated o-phenylene radicals, and R represents a lower alkyl radical.

Still a further object of the present invention is to provide quinolizine compounds having the general formulae

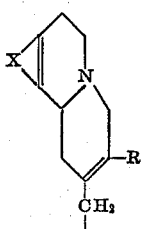 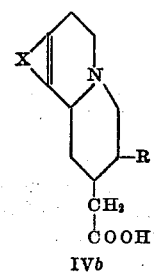

IVa           IVb wherein X represents a member selected from the group consisting of mono-, di-, tri- and tetra-(lower alkoxy)-substituted, and mono- and di-(lower alkylenedioxy)-substituted divalent butadien-1,4-ylene radicals, and R represents a lower alkyl radical.

The compounds represented by the Formulae IVa and IVb, respectively, are useful as intermediates in the synthesis of the compounds represented by Formulae I, II and III, respectively.

A preferred group of quinolizine compounds to which the present invention relates comprises 2-[(6',7'-dimethoxy-1',2',3',4'-tetrahydro-isoquinol-1'-yl)-methyl]-3-ethyl-9,10-dimethoxy - 1,4,6,7 - tetrahydro-benzo[a]quinolizine, and 2-[(6',7'-methylenedioxy - 1',2',3',4'- tetrahydro-isoquinol-1'-yl)-methyl]-3-ethyl-9,10-dimethoxy - 1,4,6,7-tetrahydro-benzo[a]quinolizine.

The present invention also provides a process for preparing quinolizine compounds which comprises condensing a compound of one of the formulae

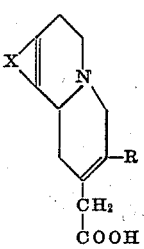 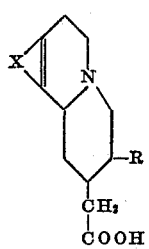

IVa           IVb wherein X represents a member selected from the group consisting of mono-, di-, tri- and tetra-(lower alkoxy)-substituted, and mono- and di-(lower alkylenedioxy)-substituted divalent butadien-1,4-ylene radicals, and R represents a lower alkyl radical, with a compound having the general formula $$Z\text{---}CH_2\text{---}CH_2\text{---}NH_2 \quad\quad V$$

wherein Z represents a member selected from the group consisting of unsubstituted, mono-, di-, tri- and tetra-(lower alkoxy)-substituted, and mono- and di-(lower alkylene-dioxy)-substituted monovalent cyclic radicals of the group consisting of phenyl, partially hydrogenated phenyl and completely hydrogenated phenyl radicals, subjecting the resulting acid amide to cyclization by treatment with dehydrating agents, and hydrogenating the cyclization product to form a compound having one of the general formulae

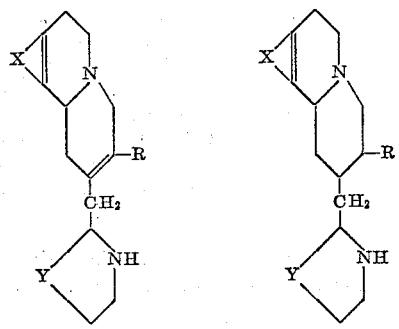

wherein X and R have the meaning defined above, and Y represents a member selected from the group consisting of unsubstituted, mono-, di-, tri- and tetra-(lower alkoxy)-substituted, and mono- and di-(lower alkylenedioxy)-substituted divalent cyclic radicals selected from the group consisting of o-phenylene, partially hydrogenated o-phenylene and completely hydrogenated o-phenylene radicals.

The reactions involved in the process according to the present invention can be represented by the following reaction scheme:

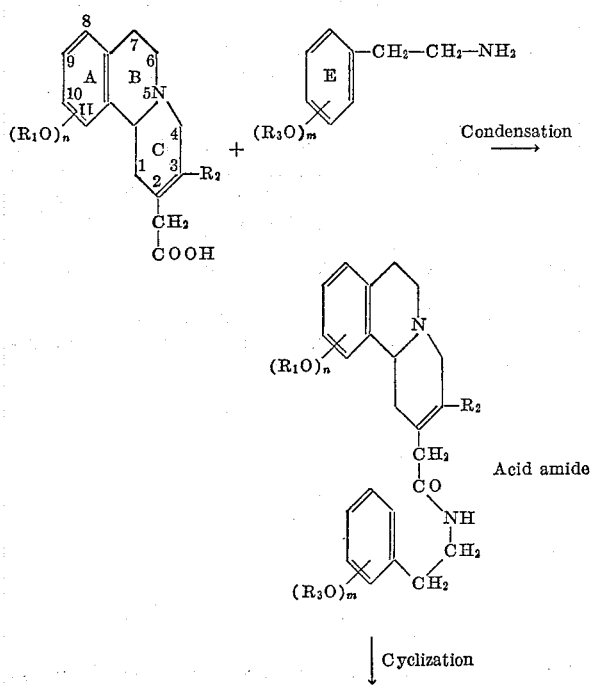

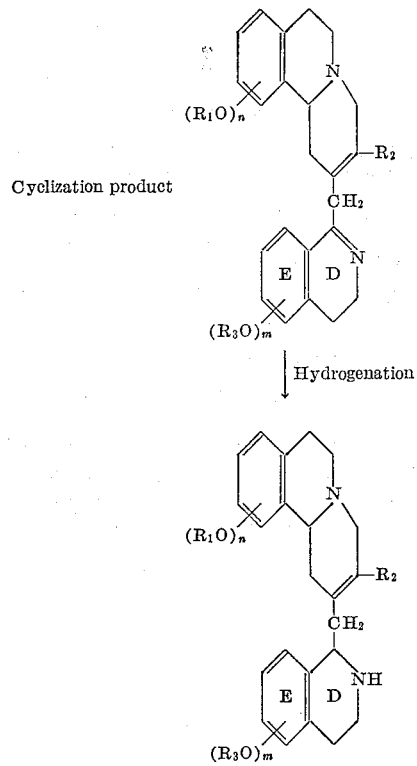

In the foregoing formulae $R_1$, $R_2$ and $R_3$ represent lower alkyl radicals, such as methyl, ethyl, propyl, butyl, isobutyl, n-hexyl, etc., and $n$ and $m$ represent numbers of the series from 0 to 4. Two adjacent groups $R_1O$ and $R_2O$, respectively, may be linked together to form alkylenedioxy groups, for example a methylenedioxy bridge. Nucleus E may be either completely aromatic, or partially or completely hydrogenated. Nucleus C may also be completely hydrogenated.

The nomenclature used in this specification for the quinolizine compounds is that of "The Ring Index." Patterson and Capell, New York, 1940, system number 1957.

The carboxymethyl-benzo[a]quinolizines used as starting compounds in the process of this invention can be prepared as follows:

DOUBLE BOND IN THE 2,3-POSITION

A 1-carbalkoxymethyl-1,2,3,4-tetrahydro-isoquinoline suitably substituted in the aromatic nucleus, a monosubstituted dimethyl malonate and formalin are condensed by a Mannich reaction, the resulting tricarboxylic acid triester is subjected to cyclization according to Dieckmann, the resulting tricyclic keto-dicarboxylic acid ester is saponified and decarboxylated, the resulting substituted 2-oxo-1,2,3,4,6,7-hexahydro-benzo[a]quinolizine is condensed with malonic acid dinitrile, and the resulting substituted 2-dicyanomethyliden-3-alkyl-1,2,3,4,-6,7-hexahydro-benzo[a]quinolizine is saponified and decarboxylated. In the resulting carboxymethyl-benzo[a]quinolizine and in the following reaction products of the present invention the double bond in the nucleus C might also occupy a position other than the 2,3-position or be semicyclicly displaced.

SATURATED CARBON-CARBON BOND IN 2,3-POSITION

The above mentioned 2-oxo-1,2,3,4,6,7-hexahydro-benzo[a]quinolizine is condensed with ethyl cyanoacetate (instead of malonic acid dinitrile), and the resulting substituted 2-(cyano - carbalkoxy - methyliden)-3-alkyl-1,2,3,4,6,7-hexahydro-benzo[a]quinolizine is hydrogenated, saponified and decarboxylated.

The first step of the process according to this invention consists in condensing a carboxymethyl-benzo[a]-quinolizine of one of the Formulae IVa and IVb with a β-phenylethylamine of Formula V. This condensation may be carried out by known methods. One convenient method consists in converting the carboxymethyl-benzo[a]quinolizine into the corresponding acid chloride by means of thionyl chloride in an inert solvent, such as chloroform, and reacting the resulting acid chloride with the β-phenyl-ethylamine. According to another mode of carrying out the condensation, the carboxymethyl-benzo[a]quinolizine and the β-phenyl-ethylamine are heated together in a water-immiscible solvent, such as benzene, toluene or xylene, in the presence of a condensing agent, such as glacial acetic acid-ammonium acetate, while continuously removing the water that forms during the reaction.

The intermediates obtained in the first step of the process of this invention are acid amides which can be represented by one of the following general formulae

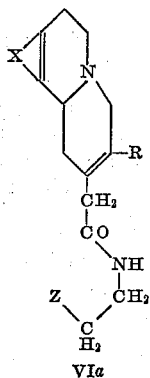 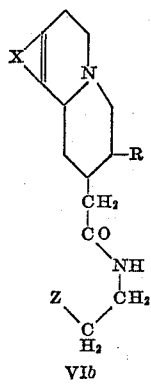

VIa      VIb wherein X, Z and R have the meaning defined above.

The second step of the process according to the present invention consists in subjecting the acid amides of Formulae VIa and VIb, respectively, to cyclization by means of dehydrating agents. One suitable cyclisation method consists in heating the acid amides with a phosphorus oxyhalide, such as phosphorus oxychloride, in an inert solvent, such as toluene or benzene. As a rule, the resulting cyclization products crystallize from the reaction solution in the form of the hydrated dihydrochlorides when phosphorus oxychloride is used as the dehydrating agent. In contradistinction to the acid amides, the cyclization products possess characteristic absorption maxima in the U. V. absorption spectrum at 240–245 mμ, 290 mμ, 302–304 mμ and 354–362 mμ (in 1/100 N hydrochloric acid).

The cyclisation products obtained in the second step of the process can be represented by one of the following general formulae.

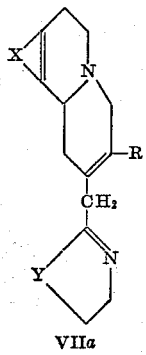 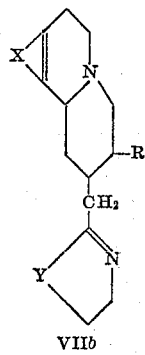

VIIa      VIIb wherein X, Y and R have the meaning defined above.

The last step of the present process consists in hydrogenating the cyclisation products of Formulae VIIa and VIIb, respectively. The hydrogenation may be carried out either catalytically or, advantageously, by means of chemical reducing agents, such as lithium boron hydride, lithium aluminum hydride, sodium boron hydride, etc. Depending on the selected reduction conditions, mixtures of two stereoisomeric compounds or stericly uniform final products are obtained. The former can be separated into the individual components by fractional crystallization. In order to obtain stericly uniform final products, the hydrogenation is preferably carried out with lithium aluminum hydride or with sodium boron hydride in a solvent which does not react with these reducing agents, e. g. in ether or in methanol.

The new quinolizine derivatives obtained by the process of the present invention are bases which form readily crystallizing, water-soluble salts with mineral acids. They possess characteristic maxima in the U. V. absorption spectrum at 230 and 282 mμ (in 1/100 N hydrochloric acid solution). They possess pronounced expectoration-promoting properties and, moreover, are characterized by their amoebicidal activity, in particular against *Entamoeba histolytica*. They are, therefore, intended for use as medicaments.

*Example 1*

1 g. of 2-dicyanomethyliden-3-ethyl-9,10-dimethoxy-1,2,3,4,6,7-hexahydro-benzo[a]quinolizine was suspended in 20 ml. of 20% hydrochloric acid, 0.05 g. of copper powder was added to the suspension, and the mixture was refluxed for 2 hours. The reaction mixture was then concentrated to dryness in vacuo, the residue was boiled with acetone, the mixture of 2-carboxymethyl-3-ethyl-9,10-dimethoxy-1,4,6,7 - tetrahydro - benzo[a]quinolizine hydrochloride and ammonium chloride crystallizing out on cooling was filtered off and dissolved in aqueous sodium carbonate solution. The solution was made acid to litmus by adding acetic acid, saturated with sodium chloride and extracted with chloroform. The chloroform extract was concentrated and the residue was boiled with acetone. There was thus obtained 2-carboxymethyl-3-ethyl-9,10-dimethoxy - 1,4,6,7 - tetrahydro - benzo[a]quinolizine of M. P. 190–195° C. (sintering at 180° C.). The hydrochloride melts at 216–218° C.

1 g. of 2-carboxymethyl-3-ethyl-9,10-dimethoxy-1,4,6,7-tetrahydro-benzo[a]quinolizine was suspended in 15 ml. of xylene, and 0.1 g. of ammonium acetate, 0.1 ml. of glacial acetic acid and 1 g. of homoveratryl amine were added to the suspension. The mixture was refluxed for 24 hours, while removing the water that formed during the reaction by azeotropic distillation. After cooling, the mixture was diluted with an equal volume of xylene, washed with water, the xylene solution was concentrated, and ether was added to the residue. The crystalline 3 - ethyl - 9,10-dimethoxy-1,4,6,7-tetrahydro-benzo[a]quinolizin-2-yl-acetic acid homoveratryl amide that separated out was recrystallized from ethyl acetate and yielded colourless platelets of M. P. 154–155° C. Hydriodide: M. P. 175–176° C.

1 g. of the homoveratryl amide of 3-ethyl-9,10-dimethoxy - 1,4,6,7 - tetrahydro-benzo[a]quinolizin - 2 - yl-acetic acid was dissolved in 80 ml. of hot benzene, and 1 g. of phosphorus oxychloride was added to the solution. The mixture was then allowed to stand for 1 hour in a bath of 80° C. and then for 24 hours at room temperature. The reaction mixture was decanted, and the separated crystals were recrystallized from methanol-ether. The air-dried 2-[(6',7'-dimethoxy-3',4'-dihydro-isoquinol-1'- yl)-methyl]-3-ethyl-9,10-dimethoxy - 1,4,6,7-tetrahydro-benzo[a]-quinolizine dihydrochloride hydrate melted at about 200° C. after preceding sintering; the acid oxalate hydrate melted at 174–176° C. The hydrate of the base obtained by treating the dihydrochloride hydrate with aqueous ammonia melted at 106–108° C.; U. V. absorption spectrum in 1/100 N hydrochloric acid: maxima at 140 mμ, 290 mμ, 304 mμ and 354 mμ.

5 g. of 2-[(6',7'-dimethoxy-3',4'-dihydro-isoquinol-1'- yl)-methyl]-3-ethyl-9,10-dimethoxy - 1,4,6,7 - tetrahydro-benzo[a]quinolizine hydrate were dissolved in 500 ml. of absolute ether, and the solution was added dropwise, while stirring, to a slurry of 1 g. of lithium aluminium hydride in 40 ml. of ether. When the reaction was completed, the reaction mixture was refluxed for ½ hour, the reaction product was decomposed with water, and the ether solution was decanted. The residue obtained after concentrating was dissolved in methanol, and alcoholic hydrochloric acid and ether were added to the solution to yield a crystalline 2-[(6',7'-dimethoxy-1',2',3',4'-tetrahydro - isoquinol - 1'-yl)-methyl] - 3 - ethyl - 9,10-dimethoxy-1,4,6,7-tetrahydro-benzo[a]quinolizine dihydrochloride hydrate in the form of prisms of M. P. 206–208° C. (sintering at 195° C.). U. V. absorption spectrum in $\frac{1}{100}$ N hydrochloric acid: maxima at 230 m$\mu$ and 282 m$\mu$.

*Example 2*

1 g. of 2-[(6',7'-dimethoxy-3',4'-dihydro-isoquinol-1'-yl)-methyl]-3-ethyl-9,10-dimethoxy - 1,4,6,7 - tetrahydro-benzo[a]quinolizine hydrate prepared according to Example 1 was dissolved in 50 ml. of methanol, and 0.25 g. of sodium boron hydride was gradually added to the solution. After standing for 12 hours at room temperature, the mixture was concentrated to dryness, the residue was dissolved in water, and the resulting base was taken up in ether. The dihydrochloride prepared by treating the base with alcoholic hydrochloric acid in methanol crystallized, after the addition of ether, in the form of hydrated prisms of M. P. 206–208° C. (after preceding sintering). The resulting dihydrochloride was identical with the dihydrochloride obtained according to Example 1.

*Example 3*

3 g. of 2-carboxymethyl-3-ethyl-9,10-dimethoxy-1,4,6,7 - tetrahydro - benzo[a]quinolizine hydrochloride (prepared according to Example 1) were suspended in 10 ml. of chloroform, and 2.5 g. of thionyl chloride were added to the solution, while cooling. After standing for 12 hours at room temperature the mixture was concentrated to dryness, the residue was dissolved in chloroform, and the solution was re-concentrated to remove excess thionyl chloride. The residue was then dissolved in 10 ml. of chloroform, the solution was filtered to remove any undissolved material, and a solution of 1 g. of homoveratryl amine in 10 ml. of chloroform was added to the filtrate. After standing for 24 hours at room temperature, the mixture was concentrated to dryness, the residue was dissolved in benzene, the benzene solution was repeatedly washed with water and then concentrated, and the homoveratryl amide was obtained in crystalline form by adding ether. After recrystallization from ethyl acetate the homoveratryl amide of 2-carboxymethyl-3-ethyl-9,10-dimethoxy-1,4,6,7-tetrahydrobenzo[a]quinolizine melted at 154–155° C.

This homoveratryl amide was converted into the 2-[(6',7'-dimethoxy-3',4'-dihydro-isoquinol - 1' - yl)methyl] - 3 - ethyl- 9,10-dimethoxy-1,4,6,7-tetrahydro-benzo[a]quinolizine dihydrochloride hydrate in the manner described in Example 1. 3 g. of this compound were dissolved in 50 ml. of water and hydrogenated by means of 0.3 g. of prehydrogenated platinum oxide catalyst. After the theoretical amount of hydrogen had been absorbed, the hydrogenation mixture was filtered, the filtrate was concentrated, and the residue was crystallized from methanol-ether. The 2-[6',7'-dimethoxy-1',2',3',4'-tetrahydro-iso-quinol-1'-yl)-methyl]-3-ethyl-9,10 - dimethoxy-1,4,6,7-tetrahydro-benzo[a]quinolizine dihydrochloride hydrate obtained in the form of fine needles melted at 231–233° C., after recrystallization from methanol-ether. U. V. absorption spectrum in $\frac{1}{100}$ N hydrochloric acid: maxima at 230 and 282 m$\mu$. (This compound is a stereoisomeric form of the compound described in Example 1.)

*Example 4*

1 g. of 2-carboxymethyl-3-ethyl-9,10-dimethoxy-1,4,6,7-tetrahydro-benzo[a]quinolizine (prepared according to Example 1) was refluxed for 24 hours with a mixture of 15 ml. of xylene, 0.1 g. of ammonium acetate, 0.1 ml. of glacial acetic acid and 1 g. of homopiperonyl amine while removing the reaction water by azeotropic distillation. After cooling, the xylene solution was diluted with an equal volume of xylene, washed with water and concentrated, and the residue was crystallized by means of ether. On recrystallization from ethyl acetate, the homopiperonyl amide of 2-carboxymethyl-3-ethyl - 9,10 - dimethoxy - 1,4,6,7 - tetrahydro - benzo[a]-quinolizine yielded colourless platelets of M. P. 149–150° C.

This compound was cyclized by treatment with phosphorus oxychloride in the manner described in Example 1 to form 2-[(6',7'-methylenedioxy-3',4'-dihydro-isoquinol-1' - yl) - methyl] - 3 - ethyl - 9,10 - dimethoxy - 1,4,6,7-tetrahydro-benzo[a]quinolizine dihydrochloride hydrate melting at about 215° C. after preceding sintering. U. V. absorption spectrum in $\frac{1}{100}$ N hydrochloric acid: maxima at 245 m$\mu$, 288 m$\mu$, 302 m$\mu$ and 362 m$\mu$. Hydrogenation of this compound with lithium aluminum hydride in the manner described in Example 1 yielded 2-[(6',7'-methylenedioxy - 1',2',3',4' - tetrahydro - isoquinol - 1'-yl) - methyl] - 3 - ethyl - 9,10 - dimethoxy - 1,4,6,7-tetrahydro - benzo[a]quinolizine. The dihydrochloride hydrate of this compound, after recrystallization from methanol-ether, melted at 220–225° C. after preceding sintering. U. V. absorption spectrum in $\frac{1}{100}$ N hydrochloric acid: maxima at 230 and 288 m$\mu$.

*Example 5*

8.4 g. of 2-dicyanomethyliden-3-n-hexyl-9,10-dimethoxy-1,2,3,4,6,7-hexahydro-benzo[a]quinolizine were dissolved in a mixture of 54 ml. of concentrated hydrochloric acid and 46 ml. of glacial acetic acid, and the solution was refluxed for 6 hours. After concentrating the reaction mixture in vacuo, the residue was dissolved in dilute aqueous ammonia, the solution was treated with activated carbon, filtered, made acid to litmus by adding acetic acid and extracted with chloroform. The residue obtained by concentrating the chloroform solution was crystallized from a mixture of butyl acetate and petroleum ether. After re-precipitation from aqueous solution, the 2-carboxymethyl-3-n-hexyl-9,10-dimethoxy-1,4,6,7 - tetrahydro - benzo[a]quinolizine melted at 151–153° C.

The homoveratryl amide of 2-carboxymethyl-3-n-hexyl-9,10 - dimethoxy - 1,4,6,7 - tetrahydro - benzo[a]quinolizine was prepared in the manner described in Example 1. After re-precipitation from a solution in ether-isopropyl ether, the amide melted at 98–100° C.

The resulting homoveratryl amide was cyclized with phosphorus oxychloride in the manner described in Example 1 to form 2-[(6',7'-dimethoxy-3',4'-dihydro-iso-quinol - 1' - yl) - methyl] - 3 - n - hexyl - 9,10 - dimethoxy-1,4,6,7-tetrahydro-benzo[a]quinolizine which was dissolved in methanol, without any preliminary purification, in the form of the free base and reduced with sodium boron hydride in the manner described in Example 2. The basic products obtained in the usual manner after concentration of the reduction mixture were dissolved in dilute hydrochloric acid, the solution was concentrated, and the residue was crystallized from methanol-ether. The dihydrochloride of 2-[(6',7'-dimethoxy - 1',2',3',4' - tetrahydro - isoquinol - 1' - yl)-methyl] - 3 - n - hexyl - 9,10 - dimethoxy - 1,4,6,7 - tetrahydro-benzo[a]quinolizine, after re-precipitation from a solution in methanol-ether, melted at 220–222° C. after preceding sintering. The U. V. absorption spectrum in $\frac{1}{100}$ N hydrochloric acid showed maxima at 232 m$\mu$ and 284 m$\mu$.

The same compound of M. P. 220–222° C. can also be prepared by catalytic reduction of 2-[(6',7'-dimethoxy-3',4' - dihydro - isoquinol - 1' - yl) - methyl] - 3 - n-hexyl - 9,10 - dimethoxy - 1,4,6,7 - tetrahydro - benzo[a]-quinolizine in hydrochloric acid solution by means of pre-hydrogenated platinum oxide catalyst.

The mother-liquor was concentrated, the residue was dissolved in alcohol, and ether was added to the solution to cause crystallization of the dihydrochloride of a 2 -[(6',7' - dimethoxy - 1',2',3',4', - tetrahydro - isoquinol - 1' - yl) - methyl] - 3 - n - hexyl - 9,10 - dimethoxy - 1,4,6,7-tetrahydro-benzo[a]quinolizine of M. P. 248–250° C. This compound is to be considered as an isomer of the compound described above.

Example 6

2 - dicyanomethyliden - 3 - isobutyl - 9,10 - dimethoxy-1,2,3,4,6,7-hexahydro-benzo[a]quinolizine (M. P. 173–175° C.) was saponified and decarboxylated in the manner described in Example 5 to form 2-carboxymethyl-3-isobutyl - 9,10 - dimethoxy - 1,4,6,7 - tetrahydro - benzo[a]quinolizine which, after re-precipitation from an aqueous solution, melted at 110° C. The corresponding homoveratryl amide prepared as described in Example 1 was cyclized by means of phosphorus oxychloride in the manner described in Example 1, to form 2-[(6',7'-dimethoxy - 3',4' - dihydro - isoquinol - 1' - yl) - methyl] - 3-isobutyl - 9,10 - dimethoxy - 1,4,6,7 - tetrahydro - benzo[a]quinolizine. The dihydrochloride hydrate of this compound, after re-precipitation from a solution in alcohol-ether, melted at 205–206° C. The U. V. absorption spectrum in 1/100 N hydrochloric acid showed maxima at 242 mμ, 290 mμ, 306 mμ and 260 mμ. The base obtained by treating an aqueous solution of the dihydrochloride with potassium carbonate solution was taken up in benzene, the benzene solution was concentrated, the residue was dissolved in methanol, and the solution was reduced with sodium boron hydride in the manner described in Example 2. After concentrating the reduction mixture in vacuo, the residue was extracted with ether, the ether solution was washed with dilute hydrochloric acid, and the hydrochloric acid extracts were concentrated. The residue crystallized from acetone. After re-precipitation from a solution in alcohol-ether, the 2 - [(6',7' - dimethoxy - 1',2',3',4' - tetrahydro - isoquinol - 1' - yl) - methyl] - 3 - isobutyl - 9,10 - dimethoxy-1,4,6,7 - tetrahydro - benzo[a]quinolizine dihydrochloride hydrate melted at 243–245° C. The U. V. absorption spectrum in 1/100 N hydrochloric acid showed maxima at 232 mμ and 284 mμ.

Example 7

2 - dicyanomethyliden - 3 - methyl - 9,10 - dimethoxy-1,2,3,4,6,7-hexahydro-benzo[a]quinolizine of M. P. 136–138° C. was saponified and decarboxylated in the manner described in Example 1 to form 2-carboxymethyl-3-methyl - 9,10 - dimethoxy - 1,4,6,7 - tetrahydro - benzo[a]quinolizine which, after re-precipitation from a solution thereof in alcohol-ether, melted at 200–201° C. This compound was reacted with homoveratryl amine in the manner described in Example 1 to form the homoveratryl amide of 2-carboxymethyl-3-methyl-9,10-dimethoxy-1,4,6,7-tetrahydro-benzo[a]quinolizine which, after re-precipitation from a solution thereof in ethyl acetate, melted at 130° C. This amide was directly cyclized by means of phosphorus oxychloride to produce 2-[(6',7'-dimethoxy - 3',4' - dihydro - isoquinol - 1' -yl) - methyl]-3 - methyl - 9,10 - dimethoxy 1,4,6,7 - tetrahydro - benzo[a]quinolizine dihydrochloride hydrate which, after re-precipitation from a solution thereof in methanol-ether, melted at 200–202° C. The U. V. absorption spectrum in 1/100 N hydrochloric acid showed maxima at 242 mμ, 290 mμ, 306 mμ and 360 mμ. The 3',4'-dihydro-isoquinoline compound was hydrogenated in the manner described in Example 6 to produce 2-[(6',7'-dimethoxy-1',2',3',4' - tetrahydro - isoquinol - 1' - yl) - methyl] - 3- methyl - 9,10 - dimethoxy - 1,4,6,7 - tetrahydro - benzo[a]quinolizine. The dihydrochloride hydrate of this compound, after re-precipitation from a solution thereof in 90% methanol-ether, melted at 228–230° C. The U. V. absorption spectrum in 1/100 N hydrochloric acid showed maxima at 232 mμ and 284 mμ.

Example 8

2-dicyanomethyliden-3-n-butyl - 9,10 - dimethoxy-1,2,3,4,6,7-hexahydro-benzo[a]quinolizine of M. P. 165–166° C. was saponified and decarboxylated in the manner described in Example 1 to produce 2-carboxymethyl-3-n-butyl-9,10-dimethoxy-1,4,6,7-tetrahydro - benzo[a]quinolizine which, after re-precipitation from a solution thereof in ethyl acetate, melted at 165–167° C. This compound was reacted with homoveratryl amine in the manner described in Example 1 to produce the homoveratryl amide of 2-carboxymethyl-3-n-butyl-9,10-dimethoxy-1,4,6,7-tetrahydrobenzo[a]quinolizine which was cyclized by means of phosphorus oxychloride in the manner described in Example 1 to produce 2-[(6',7'-dimethoxy-3',4'-dihydro-isoquinol-1'-yl)-methyl]-3-n-butyl-9,10-dimethoxy - 1,4,6,7-tetrahydro-benzo[a]quinolizine. The dihydrochloride hydrate of this compound, after re-precipitation from a solution thereof in methanol-ether, melted at 186–188° C. The U. V. absorption spectrum in 1/100 N hydrochloric acid showed maxima at 243 mμ, 291 mμ, 306 mμ and 360 mμ.

The base separated from the 2-[(6',7'-dimethoxy-3',4'-dihydro - isoquinol-1'-yl)-methyl]-3-n-butyl-9,10-dimethoxy-1,4,6,7 - tetrahydro-benzo[a]quinolizine dihydrochloride hydrate in the manner described in Example 6 was reduced with lithium aluminium hydride in the manner described in Example 1. The dihydrochloride hydrate of 2-[(6',7'-dimethoxy-1',2',3',4'-tetrahydro-isoquinol-1'-yl)-methyl] - 3 - n - butyl-9,10-dimethoxy-1,4,6,7-tetrahydro-benzo[a]quinolizine obtained from the reaction product in the manner described in Example 6 melted at 224–226° C., after re-precipitation from methanol-ether. The U. V. absorption spectrum in 1/100 N hydrochloric acid showed maxima at 232 mμ and 284 mμ.

The same dihydrochloride hydrate of M. P. 224–226° C. can also be obtained by catalytic reduction of 2-[(6', 7'-dimethoxy-3',4'-dihydro - isoquinol-1'-yl)-methyl]-3-n-butyl-9,10-dimethoxy-1,4,6,7-tetrahydro - benzo[a]quinolizine in dilute hydrochloric acid by means of pre-hydrogenated platinum oxide catalyst. When concentrating the mother-liquor and boiling the residue with acetone, a 2-[(6',7'-dimethoxy-1',2',3',4'-tetrahydro - isoquinol-1'-yl)-methyl]-3-n-butyl-9,10-dimethoxy-1,4,6,7-tetrahydro-benzo[a]quinolizine dihydrochloride crystallized out which, after re-precipitation from alcohol-ether, melted at 243–245° C. This compound is an isomer of the compound described above.

Example 9

From 2-carboxymethyl-3-ethyl-9,10-dimethoxy-1,4,6,7-tetrahydro-benzo[a]quinolizine and β-(m-methoxy-phenyl)-ethylamine, there was prepared in the manner described in Example 1, the β-(m-methoxy-phenyl)-ethyl-amide of 2-carboxymethyl-3-ethyl-9,10-dimethoxy-1,4,6,7-tetrahydro-benzo[a]quinolizine. This compound, which melted at 110° C. after recrystallization from ethyl acetate, was cyclized and reduced in the manner described in Example 1. There was thus obtained 2-[(6'-methoxy-1',2',3',4'-tetrahydro - isoquinol-1'-yl)-methyl]-3-ethyl-9,10-dimethoxy-1,4,6,7-tetrahydro - benzo[a]quinolizine dihydrochloride hydrate of M. P. 242–245° C. U. V. absorption spectrum in 1/100 N hydrochloric acid: maxima at 220 and 280 mμ.

Example 10

From 2-carboxymethyl-3-ethyl-9,10-dimethoxy-1,4,6,7-tetrahydro-benzo[a]quinolizine and β-(3,4-diethoxyphenyl)-ethylamine, there was prepared, in the manner described in Example 1, the β-(3',4'-diethoxy-phenyl)-ethylamide of 2-carboxymethyl-3-ethyl-9,10-dimethoxy-1,4,6,7-tetrahydro-benzo[a]quinolizine. This amide, which melted at 126–127° C. after recrystallization from ethyl acetate, was subjected to cyclization and reduction in the manner described in Example 1. There was thus obtained 2-[(6',7'-diethoxy-1',2',3',4'-tetrahydro - isoquinol-1'-yl)-methyl]-3-ethyl-9,10-dimethoxy-1,4,6,7-tetrahydro-benzo[a]quinolizine dihydrochloride hydrate of M. P. 205–207° C.; U. V. absorption spectrum in 1/100 N hydrochloric acid: maxima at 233 mμ and 285 mμ.

*Example 11*

From 2-carboxymethyl-3-ethyl-9,10-dimethoxy-1,4,6,7-tetrahydro-benzo[a]quinolizine and mezcaline, there was prepared, in the manner described in Example 1, the β-(3',4',5'-trimethoxy-phenyl)-ethylamide of 2-carboxymethyl-3-ethyl-9,10-dimethoxy-1,4,6,7-tetrahydro - benzo[a]quinolizine. This amide, which melted at 126–128° C. after recrystallization from ethyl acetate, was subjected to cyclization and reduction in the manner described in Example 2. There was thus obtained 2-[(6',7',8'-trimethoxy - 1',2',3',4' - tetrahydro-isoquinol-1'-yl)-methyl]-3-ethyl-9,10-dimethoxy-1,4,6,7 - tetrahydrobenzo[a]quinolizine dihydrochloride hydrate of M. P. 243–245° C.; U. V. absorption spectrum in 1/100 N hydrochloric acid: maximum at 280 mμ. In addition to this compound, there was obtained, in the catalytic hydrogenation according to Example 5, an isomeric dihydrochloride hydrate of M. P. 223–225° C.; U. V. absorption spectrum in 1/100 N hydrochloric acid: maximum at 280 mμ.

*Example 12*

From 2-carboxymethyl-3-ethyl-9,10-dimethoxy-1,4,6,7-tetrahydro-benzo[a]quinolizine and (1-cyclohexen-1-yl)-ethylamine, there was prepared, in the manner described in Example 1, the (1-cyclohexen-1-yl)-ethylamide of 2-carboxymethyl-3-ethyl-9,10-dimethoxy-1,4,6,7-tetrahydrobenzo[a]quinolizine. This amide, which melted at 155–156° C. after recrystallization from ethyl acetate, was subjected to cyclization and reduction in the manner described in Example 1. There was thus obtained 2-[(1',2',3',4',5',6',7',8'-octahydro - isoquinol-1'-yl)-methyl]-3-ethyl-9,10-dimethoxy-1,4,6,7-tetrahydro-benzo[a]quinolizine dihydrochloride of M. P. 268–270° C.; U. V. absorption spectrum in 1/100 N hydrochloric acid: maxima at 232 mμ and 284 mμ.

*Example 13*

1 g. of 2-oxo-3-ethyl-9,10-dimethoxy-1,2,3,4,6,7-hexahydro-benzo[a]quinolizine, 0.5 g. of ethyl cyanoacetate, 0.1 g. of ammonium acetate and 0.1 ml. of glacial acetic acid were refluxed for 4 hours in 3 ml. of toluene, while the water of reaction was removed by azeotropic distillation. After cooling, the mixture was extracted with 3 N hydrochloric acid, the hydrochloric acid extracts were washed with ether, and the basic portions separated by adding caustic soda solution were taken up in ether. After concentrating the ether solution, dissolving the residue in alcoholic hydrochloric acid and adding ether to the solution, 2-(cyano-carbethoxy - methyliden)-3-ethyl-9,10-dimethoxy - 1,2,3,4,6,7 - hexahydro-benzo[a]quinolizine hydrochloride of M. P. 160–162° C. crystallized out. Hydrochloride: M. P. 160–162° C. Hydrobromide: M. P. 182–184° C. The free base prepared from the hydrochloride melted at 130–132° C. U. V. absorption spectrum of the hydrochloride in ethanol λmax.=233 mμ, ε=24,300, and λmax.=283 mμ, ε=5450.

1 g. of 2-(cyano-carbethoxy-methyliden)-3-ethyl-9,10-dimethoxy-1,2,3,4,6,7-hexahydro-benzo[a]quinolizine hydrochloride was dissolved in 20 ml. of ethanol, and the solution was hydrogenated in the presence of 0.1 g. of pre-hydrogenated platinum oxide catalyst until the theoretical amount of hydrogen had been absorbed. After concentration of the reaction mixture, water was added to the residue, and the mixture was made acid to Congo by adding hydrochloric acid. After standing for a while, the mixture was filtered. The 2-(cyano-carbethoxy-methyl)-3-ethyl-1,2,3,4,6,7-hexahydrobenzo[a]quinolizine hydrochloride crystallized in the form of colourless platelets which melted at 213–214° C. after re-precipitation from 70% ethanol-ether. U. V. absorption spectrum in ethanol: λmax.=230 mμ, ε=7900, and λmax.=284 mμ, ε=3700.

1 g. of 2-(cyano-carbethoxy-methyl)-3-ethyl-9,10-dimethoxy-1,2,3,4,6,7 - hexahydro-benzo[a]quinolizine hydrochloride was suspended in 50 ml. of 20% hydrochloric acid, and the suspension was refluxed for 2 hours. The reaction mixture was concentrated to dryness, the residue was dissolved in a small amount of water, and the separated crystals were filtered off. The air-dried crystals of 2-carboxymethyl-3-ethyl-9,10-dimethoxy-1,2,3,4,6,7-hexahydro-benzo[a]quinolizine hydrochloride melted unsharply at 100° C. Methyl ester hydrochloride: M. P. 215–216° C.

1 g. of 2-carboxymethyl-3-ethyl-9,10-dimethoxy-1,2,3,4,6,7-hexahydro-benzo[a]quinolizine hydrochloride, 3 g. of homoveratryl amine, 0.3 g. of ammonium acetate and 0.3 ml. of glacial acetic acid were suspended in 40 ml. of xylene, and the suspension was refluxed for 24 hours, while the water of reaction was removed by azeotropic distillation. After cooling, the reaction mixture was diluted with an equal amount of xylene. The xylene solution was washed with water and then concentrated, and ether was added to the residue. The crystalline homoveratryl amide of 2-carboxymethyl-3-ethyl-9,10-dimethoxy-1,2,3,4,6,7-hexahydro-benzo[a]quinolizine, after re-precipitation from ethyl acetate, melted at 154–155° C. Hydriodide: M. P. 220–221° C.

1 g. of the homoveratryl amide of (3-ethyl-9,10-dimethoxy-1,2,3,4,6,7-hexahydro-benzo[a]quinolizin-2-yl)-acetic acid was dissolved in 20 ml. of benzene, 0.5 g. of phosphorus oxychloride was added to the solution, and the mixture was heated for 1 hour at 80° C. After cooling, the separated oil was decanted off and boiled with acetone with the addition of water. After re-precipitation from methanol-ether and air-drying at 50° C., the crystalline 2-[(6',7'-dimethoxy-3',4',-dihydro-isoquinol-1'-yl) - methyl]-3-ethyl-9,10-dimethoxy - 1,2,3,4,6,7 - hexahydro-benzo[a]quinolizine dihydrochloride hydrate melted at 122–124° C. after preceding sintering and turned red while melting. The acid oxalate hydrate melted at 144–146° C. after preceding sintering and turned red while melting. The U. V. absorption spectrum in 1/100 N hydrochloric acid showed maxima at 240 mμ, 290 mμ, 304 mμ and 354 mμ.

1 g. of 2-[(6',7'-dimethoxy-3',4'-dihydro-isoquinol-1'-yl)-methyl]-3-ethyl-9,10-dimethoxy - 1,2,3,4,6,7 - hexahydro-benzo[a]quinolizine dihydrochloride hydrate was dissolved in water. The bases which separated on alkalinizing the solution by means of ammonia were taken up in ether, the ether solution was concentrated, the residue was dissolved in 100 ml. of absolute ether, undissolved material was removed by filtration, and 0.2 g. of lithium aluminum hydride was added to the ether solution. When the spontaneous reaction had worn off, the reaction mixture was refluxed for ½ hour, water was added thereto, and the ether solution was decanted and concentrated. The residue was dissolved in 90% methanol, the solution was rendered acid to Congo by the addition of alcoholic hydrochloric acid, and ether was added until the solution became turbid. Coarse prisms of a 2-[(6',7'-dimethoxy-1',2',3',4'-tetrahydro-isoquinol-1'-yl)-methyl] - 3 - ethyl-9,10-dimethoxy-1,2,3,4,6,7-hexahydro - benzo[a]quinolizine dihydrochloride hydrate crystallized out which, after re-precipitation from ethanol-ether, melted at 253–255° C. after preceding sintering. The U. V. absorption spectrum showed maxima at 231 and 282 mμ. The acid oxalate hydrate melted at 163–165° C. after preceding sintering. The mother liquor was concentrated, and the residue was re-precipitated from methanol-ether. There was thus obtained the dihydrochloride hydrate of a second, stereo-isomeric compound melting at 213–215° C. after preceding sintering. Acid oxalate hydrate: M. P. 190–192° C. The U. V. absorption spectrum in 1/100 N hydrochloric acid showed maxima at 231 and 282 mµ.

*Example 14*

2-[(6',7'-dimethoxy-3',4'-dihydro-isoquinol-1'-yl)-methyl]-3-ethyl-9,10-dimethoxy-1,2,3,4,6,7-hexahydro-benzo[a]quinolizine oxalate hydrate obtained in the manner described in Example 13 was catalytically hydrogenated by means of pre-hydrogenated platinum oxide catalyst, and the hydrogenation mixture was worked up in the manner described in Example 13. There were thus obtained two stereoisomeric dihydrochloride hydrates of M. P. 253–255° C. and 213–215° C. respectively, in an analogous manner.

*Example 15*

17.4 g. of 2-oxo-3-n-hexyl-9,10-dimethoxy-1,2,3,4,6,7-hexahydro-benzo[a]quinolizine, 8.4 g. of ethyl cyano-acetate, 1.5 g. of ammonium acetate and 1.7 ml. of glacial acetic acid were suspended in 40 ml. of toluene, and the suspension was refluxed for two hours, while removing the water of reaction by azeotropic distillation. Then, 20 ml. of methanol, 20 ml. of acetone and 5 ml. of 48% hydrobromic acid were added to the contents of the reaction flask, and ether was added to the solution until it became turbid. The 2-(cyano-carbethoxy-methyliden)-3-n-hexyl-9,10-dimethoxy-1,2,3,4,6,7-hexahydro-benzo[a]-quinolizine hydrobromide melted at 185–187° C. after re-precipitation from aqueous alcohol.

7.1 g. of this hydrobromide were dissolved in 500 ml. of ethanol, and the solution was subjected to hydrogenation by means of 0.6 g. of pre-hydrogenated platinum oxide catalyst until the theoretical amount of hydrogen had been absorbed. The hydrogenation mixture was filtered, the filtrate was concentrated, and the residue was re-precipitated from alcohol-ether. The 2-(cyano-carbethoxy-methyl)-3-n-hexyl-9,10-dimethoxy-1,2,3,4,6,7-hexahydro-benzo[a]quinolizine hydrobromide melted at 195–198° C. after re-precipitation from alcohol-ether. The base obtained by adding sodium carbonate to an aqueous solution of the hydrobromide was taken up in ether, the ethereal solution was concentrated, and the residue was dissolved in 48 ml. of 18% hydrochloric acid and 12 ml. of glacial acetic acid. 10 mg. of copper powder were added to the solution, and the mixture was refluxed for 4 hours. The reaction mixture was concentrated to dryness, the residue was dissolved in hot acetone, the solution was filtered and concentrated, the residue was again dissolved in a small amount of acetone, and the solution was allowed to stand. After re-precipitation from alcohol-ether (1:1), the 2-carboxymethyl-3-n-hexyl-9,10-dimethoxy-1,2,3,4,6,7-hexahydro-benzo[a]quinolizine hydrochloride melted at 208–210° C. This hydrochloride was reacted with homoveratryl amine in the manner described in Example 13 to produce the corresponding crystalline homoveratryl amide which, after re-precipitation from methanol-water, melted at 135–136° C. This homoveratryl amide was cyclized by means of phosphorus oxychloride in the manner described in Example 13 to produce 2-[(6',7'-dimethoxy-3',4'-dihydro-isoquinol-1'-yl)-methyl]-3-n-hexyl-9,10-dimethoxy-1,2,3,4,6,7-hexahydro-benzo[a]quinolizine dihydrochloride hydrate which, after preceding sintering, melted at 180° C.

The base obtained by adding aqueous sodium carbonate to an aqueous solution of the dihydrochloride was taken up in ether, the ether solution was concentrated, the residue was dissolved in methanol, and sodium boron hydride was added to the solution. The mixture was allowed to stand overnight and then concentrated, the residue was rendered alkaline by the addition of sodium carbonate, taken up in ether, and the ether solution was extracted with dilute N hydrochloric acid. After concentrating the hydrochloric acid extract, the residue was dissolved in a small amount of water and the solution was allowed to stand. The 2-[(6',7'-dimethoxy-1',2',3',4'-tetrahydro-isoquinol-1'-yl)-methyl]-3-n-hexyl-9,10-dimethoxy-1,2,3,4,6,7-hexahydro-benzo[a]quinolizine dihydrochloride hydrate melted at 194–196° C. after re-precipitation from a solution thereof in water. The U. V. absorption spectrum in 1/100 N hydrochloric acid showed maxima at 232 mµ and 284 mµ.

*Example 16*

15.8 g. of 2-oxo-3-isobutyl-9,10-dimethoxy-1,2,3,4,6,7-hexahydro-benzo[a]quinolizine were condensed with 8.5 g. of ethyl cyanoacetate in the manner described in Example 15. The hydrobromide of 2-(cyano-carbethoxy-methyliden)-3-isobutyl-9,10-dimethoxy-1,2,3,4,6,7-hexahydro-benzo[a]quinolizine obtained in the described manner melted at 189–190° C. after re-precipitation from a solution thereof in alcohol-ether (1:1). The quinolizine compound thus obtained was hydrogenated in the manner described in Example 15 to produce 2-(cyano-carbethoxy-methyl)-3-isobutyl-9,10-dimethoxy-1,2,3,4,6,7-hexahydro-benzo[a]quinolizine. Hydrochloride: M. P. 205–207° C. This hydrochloride was saponified and decarboxylated in the manner described in Example 15 to produce 2-carboxymethyl-3-isobutyl-9,10-dimethoxy-1,2,3,4,6,7-hexahydro-benzo[a]quinolizine hydrochloride which melted at 233–234° C. after re-precipitation from a solution thereof in alcohol-ether. This compound was reacted with homoveratryl amine in an analogous manner to produce the corresponding homoveratryl amide of M. P. 119–121° C. This amide was subjected to cyclization and hydrogenation in the manner described in Example 15 to produce 2-[(6',7'-dimethoxy-1',2',3',4'-tetrahydro-isoquinol-1'-yl)-methyl]-3-isobutyl-9,10-dimethoxy-1,2,3,4,6,7-hexahydro-benzo[a]quinolizine. The dihydrochloride hydrate melted at 270° C. after re-precipitation from a solution thereof in alcohol-ether. The U. V. absorption spectrum in 1/100 N hydrochloric acid showed maxima at 232 and 284 mµ.

*Example 17*

2-carboxymethyl-3-ethyl-9,10-dimethoxy-1,2,3,4,6,7-hexahydro-benzo[a]quinolizine hydrochloride prepared in the manner described in Example 13 was reacted with β-(3,4-diethoxyphenyl)-ethylamine to produce the corresponding (3',4'-diethoxyphenyl)-ethylamide which, after re-precipitation from ethyl acetate-petroleum ether, melted at 130–131° C. This amide was cyclized by means of phosphorus oxychloride in the manner described in Example 15, and the resulting 3',4'-dihydro base was hydrogenated with sodium boron hydride in methanol to produce 2-[(6',7'-diethoxy-1',2',3',4'-tetrahydro-isoquinol-1'-yl)-methyl]-3-ethyl-9,10-dimethoxy-1,2,3,4,6,7-hexahydro-benzo[a]quinolizine. The dihydrochloride hydrate thereof melted at 215–218° C., after re-precipitation from methanol-ether. The U. V. absorption spectrum in 1/100 N hydrochloric acid showed maxima at 232 mµ and 282 mµ. By concentrating the mother liquors and re-precipitation of the residue from a solution thereof in 80% methanol-ether, there was obtained the dihydrochloride of an isomeric compound of M. P. 201–203° C. U. V. absorption spectrum in 1/100 N hydrochloric acid showed maxima at 232 and 284 mµ.

*Example 18*

2-carboxymethyl-3-ethyl-9,10-dimethoxy-1,2,3,4,6,7-hexahydro-benzo[a]quinolizine hydrochloride prepared in the manner described in Example 13 was reacted with β-(3,4,5-trimethoxy-phenyl)-ethylamine to produce the corresponding (3',4',5'-trimethoxy-phenyl)-ethylamide which, after re-precipitation from a solution thereof in ethyl acetate-petroleum ether, melted at 123–

125° C. This compound was cyclized by means of phosphorus oxychloride, and the 6',7',8'-trimethoxy-3',4'-dihydro base formed as an intermediate was hydrogenated with sodium boron hydride in methanol, in the manner described in Example 15, to produce a 2-[(6',7',8'-trimethoxy - 1',2',3',4' - tetrahydro - isoquinol - 1' - yl)-methyl] - 3 - ethyl - 9,10 - dimethoxy - 1,2,3,4,6,7 - hexahydro-benzo[a]quinolizine. The dihydrochloride hydrate of this compound, after re-precipitation from a solution thereof in 95% methanol-ether, melted at 211–213° C. The U. V. absorption spectrum in 1/100 N hydrochloric acid showed a maximum at 281 mμ.

Example 19

2 - carboxymethyl - 3 - ethyl - 9,10 - dimethoxy - 1,2,3,4,6,7-hexahydro-benzo[a]quinolizine hydrochloride prepared in the manner described in Example 13 was reacted with homopiperonyl amine to produce the corresponding homopiperonyl amide which, after re-precipitation from a solution thereof in ethyl acetate-petroleum ether, melted at 135–136° C. Cyclization of this compound with phosphorus oxychloride and hydrogenation of the intermediate 3',4'-dihydrobase with sodium boron hydride in methanol in the manner described in Example 15 yielded 2-[(6',7'-methylenedioxy-1',2',3',4'-tetrahydro - isoquinol - 1' - yl) - methyl] - 3 - ethyl - 9,10 - dimethoxy-1,2,3,4,6,7-hexahydro-benzo[a]quinolizine. The dihydrochloride hydrate of this compound melted at 234–236° C., after re-precipitation from a solution thereof in methanol-ether. The U. V. absorption spectrum in 1/100 N hydrochloric acid showed maxima at 230 and 288 mμ.

Example 20

2 - carboxymethyl - 3 - ethyl - 9,10 - dimethoxy - 1,2,3,4,6,7-hexahydro-benzo[a]quinolizine hydrochloride prepared in the manner described in Example 13 was reacted with β-(m-methoxy-phenyl)-ethylamine to produce the corresponding (m-methoxy-phenyl)-ethylamide which, upon cyclization by means of phosphorus oxychloride and hydrogenation with sodium boron hydride in methanol, in the manner described in Example 15, yielded 2 - [7' - methoxy-1',2',3',4'-tetrahydro-isoquinol-1' - yl) - methyl] - 3 - ethyl - 9,10 - dimethoxy - 1,2,3,4,6,7-hexahydro-benzo[a]quinolizine. The dihydrochloride hydrate melted at 224–226° C., after re-precipitation from a solution thereof in methanol-ether. The U. V. absorption spectrum in 1/100 N hydrochloric acid showed maxima at 230 and 280 mμ.

Example 21

From 2-oxo-3-n-butyl-9,10-dimethoxy-1,2,3,4,6,7-hexahydro-benzo[a]quinolizine and ethyl cyanoacetate there was prepared, in the manner described in Example 15, 2 - (cyanocarbethoxy 1 methyliden) - 3 - butyl - 9,10-dimethoxy - 1,2,3,4,6,7 - hexahydro - benzo[a]quinolizine. Hydrochloride: M. P. 176–178° C. U. V. absorption spectrum of the hydrochloride in ethanol: λmax.=234 mμ, ε=22,000, and λmax.=282 mμ, ε=4670. The hydrochloride was hydrogenated in ethanol by means of pre-reduced platinum oxide catalyst to produce the hydrochloride of 2-(cyano-carbethoxy-methyl)-3-n-butyl-9,10 - dimethoxy - 1,2,3,4,6,7 - hexahydro-benzo[a]quinolizine of M. P. 200–202° C. U. V. absorption spectrum in ethanol; λmax.=232 mμ, ε=8000, and λmax.=284 mμ, ε=2680.

On saponification and decarboxylation of this hydrochloride in the manner described in the preceding examples, there was obtained the hydrochloride of 2-carboxymethyl - 3 - n - butyl - 9,10 - dimethoxy - 1,2,3,4,6,7-hexahydro-benzo[a]quinolizine melting at 148–150° C., after re-precipitation from an aqueous solution thereof.

This hydrochloride was reacted with homoveratryl amine to produce the corresponding homoveratryl amide of M. P. 128–129° C. The latter was subjected to cyclization and hydrogenation, in the manner described in Example 15, to produce 2-[(6',7'-dimethoxy-1',2',3',4'-tetrahydro - isoquinol - 1' - yl) - methyl] - 3 - n - butyl-9,10 - dimethoxy - 1,2,3,4,6,7 - hexahydro-benzo[a]quinolizine. The dihydrochloride hydrate of this compound melted, after re-precipitation from a solution thereof in 80% methanol-ether, at 230–232° C. The U. V. absorption spectrum in 1/100 N hydrochloric acid showed maxima at 232 and 282 mμ.

We claim:

1. Compounds having the general formula

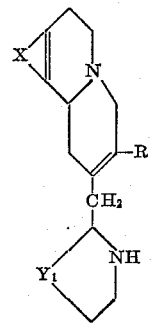

wherein X represents a member selected from the group consisting of mono-, di-, tri- and tetra-(lower alkoxy)-substituted, and mono- and di-(lower alkylenedioxy)-substituted divalent butadien-1,4-ylene radicals, Y₁ represents a member selected from the group consisting of unsubstituted, mono-, di-, tri- and tetra-(lower alkoxy)-substituted, and mono- and di-(lower alkylenedioxy)-substituted o-phenylene radicals, and R represents a lower alkyl radical.

2. 2 - [(6',7' - dimethoxy - 1',2',3',4' - tetrahydro-isoquinol - 1' - yl) - methyl] - 3 - ethyl - 9,10 - dimethoxy-1,4,6,7-tetrahydro-benzo[a]quinolizine.

3. 2 - [(6',7' - methylenedioxy - 1',2',3',4', - tetrahydro-isoquinol - 1' - yl) - methyl] - 3 - ethyl - 9,10 - dimethoxy-1,4,6,7-tetrahydro-benzo[a]quinolizine.

4. A compound having the general formula

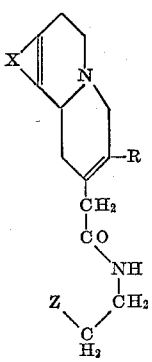

wherein X represents a member selected from the group consisting of mono-, di-, tri- and tetra-(lower alkoxy)-substituted, and mono- and di-(lower alkylenedioxy)-substituted divalent butadien-1,4-ylene radicals, Z represents a member selected from the group consisting of unsubstituted, mono-, di-, tri- and tetra-(lower alkoxy)-substituted, and mono- and di-(lower alkylenedioxy)-substituted monovalent cyclic radicals of the group consisting of phenyl, partially hydrogenated phenyl and completely hydrogenated phenyl radicals, and R represents a lower alkyl radical.

5. A compound having the general formula

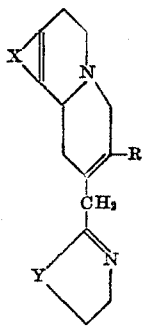

wherein X represents a member selected from the group consisting of mono-, di-, tri- and tetra-(lower alkoxy)-substituted, and mono- and di-(lower alkylenedioxy)-substituted divalent butadien-1,4-ylene radicals, Y represents a member selected from the group consisting of unsubstituted, mono-, di-, tri- and tetra-(lower alkoxy)-substituted, and mono- and di-(lower alkylenedioxy)-substituted divalent cyclic radicals selected from the group consisting of o-phenylene, partially hydrogenated o-phenylene and completely hydrogenated o-phenylene radicals, and R represents a lower alkyl radical.

6. 3 - ethyl - 9,10 - dimethoxy - 1,4,6,7 - tetrahydro - benzo[a]quinolizine-2-yl-acetic acid homoveratryl amide.

7. 2 - [(6',7' - dimethoxy - 3',4' - dihydro - isoquinol - 1' - yl) - methyl] - 3 - ethyl - 9,10 - dimethoxy, - 1,4,6,7 - tetrahydro-benzo[a]quinolizine.

References Cited in the file of this patent

Manske: The Alkaloids, vol. III, 1953, Academic Press, N. Y., pp. 363—394.

Shigehiko: Jour. Pharm. Soc., Japan, vol. 62, 1942, pp. 77–82.

Battersby et al.: Experientia, vol. 6, 1950, pp. 378–9.

Chem. Abstracts, vol. 45, pp. 2954–2955.

UNITED STATES PATENT OFFICE
Certificate of Correction

Patent No. 2,877,226

March 10, 1959

Arnold Brossi et al.

It is hereby certified that error appears in the printed specification of the above numbered patent requiring correction and that the said Letters Patent should read as corrected below.

Column 1, lines 48 to 60, the formula should appear as shown below instead of as in the patent—

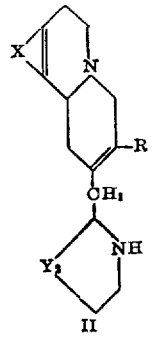

column 4, line 43, for ' "The Ring Index." ' read —"The Ring Index"—; column 6, line 74, for "140 mµ" read —240 mµ—; column 7, line 59, for ")methyl]-" read —)-methyl]- —; line 68, for "[6'," read —[(6',—; column 9, line 67, for "-dimethoxy 1,4,6,7-" read — -dimethoxy-1,4,6,7- —; column 12, line 42, for "-3',4,-" read — -3',4'- —; column 15, line 58, for "-(cyanocarbethoxy 1 methyliden)-3-butyl-" read — -(cyanocarbethoxy-methyliden)-3-n-butyl- —; line 68, for "ethanol;" read —ethanol:—; line 69, for "ε=2680" read —ε=3680—; column 18, line 10, for "-dimethoxy,-" read — -dimethoxy- —.

Signed and sealed this 7th day of July 1959.

[SEAL]

Attest:
KARL H. AXLINE,
*Attesting Officer.*

ROBERT C. WATSON,
*Commissioner of Patents.*